(12) United States Patent
Robbins et al.

(10) Patent No.: US 11,565,592 B2
(45) Date of Patent: Jan. 31, 2023

(54) AUXILIARY POWER OUTPUT FOR BATTERY MANAGEMENT SYSTEM

(71) Applicant: Club Car, LLC, Evans, GA (US)

(72) Inventors: John Robbins, Evans, GA (US); Todd Steele, Martinez, GA (US); Robert Edwards, Martinez, GA (US)

(73) Assignee: Club Car, LLC, Evans, GA (US)

( * ) Notice: Subject to any disclaimer, the term of this patent is extended or adjusted under 35 U.S.C. 154(b) by 372 days.

(21) Appl. No.: 16/695,950

(22) Filed: Nov. 26, 2019

(65) Prior Publication Data
US 2020/0171960 A1    Jun. 4, 2020

Related U.S. Application Data

(60) Provisional application No. 62/772,941, filed on Nov. 29, 2018.

(51) Int. Cl.
*B60L 15/20* (2006.01)
*B60L 50/60* (2019.01)
(Continued)

(52) U.S. Cl.
CPC ......... *B60L 15/2009* (2013.01); *B60L 3/0046* (2013.01); *B60L 3/0084* (2013.01);
(Continued)

(58) Field of Classification Search
CPC ...... B60L 58/20; B60L 7/10; B60L 2240/547; B60L 15/007; B60L 50/60; B60L 3/0046;
(Continued)

(56) References Cited

U.S. PATENT DOCUMENTS 5,899,284 A * 5/1999 Reimers ................ B62B 5/0026
                                                   280/DIG. 6
2005/0253460 A1* 11/2005 Nakanishi .............. B60L 58/21
                                                        307/10.1
(Continued)

FOREIGN PATENT DOCUMENTS

EP    2193954 A1    6/2010
EP    3342654 A1    7/2018
(Continued)

OTHER PUBLICATIONS

Extended European Search Report for Application No. 19891073.9 dated Jul. 14, 2022, 10 pages.
(Continued)

*Primary Examiner* — Jared Fureman
*Assistant Examiner* — Duc M Pham
(74) *Attorney, Agent, or Firm* — Edell, Shapiro & Finnan, LLC

(57) ABSTRACT

A utility cart includes a stored energy device that can be in the form of a Lithium Ion battery pack. The battery pack can include a main power output useful to drive high voltage components as well as the electric motor for motive power. The battery pack can also include one or more auxiliary outputs useful to provide auxiliary power to various other components. The auxiliary outputs can be either low and/or high voltage outputs. An auxiliary DC/DC output can be used to step down high voltage of the Lithium ion battery pack to lower voltages. A motor controller supply can also be provided as an auxiliary output to provide some power to a motor controller.

20 Claims, 11 Drawing Sheets

(51) Int. Cl.
  *B60L 58/10* (2019.01)
  *B60L 3/00* (2019.01)
  *B60L 7/10* (2006.01)
(52) U.S. Cl.
  CPC ............ *B60L 7/10* (2013.01); *B60L 50/60* (2019.02); *B60L 58/10* (2019.02); *B60L 2200/22* (2013.01); *B60L 2210/10* (2013.01)
(58) Field of Classification Search
  CPC ............ B60L 2200/22; B60L 2210/10; B60L 2260/22; B60L 1/00; B60L 2250/22; Y02T 10/70
  See application file for complete search history.

(56) References Cited

U.S. PATENT DOCUMENTS

| | | | | |
|---|---|---|---|---|
| 2010/0301668 | A1* | 12/2010 | Yakes | H02J 7/00712 |
| | | | | 307/9.1 |
| 2012/0256568 | A1* | 10/2012 | Lee | B60L 53/14 |
| | | | | 429/150 |
| 2013/0173100 | A1* | 7/2013 | Takagi | B60L 3/0061 |
| | | | | 180/65.265 |
| 2018/0257688 | A1 | 9/2018 | Carter et al. | |

FOREIGN PATENT DOCUMENTS

| | | |
|---|---|---|
| JP | H10224902 A | 8/1998 |
| JP | 2005323470 A | 11/2005 |
| JP | 2007295699 A | 11/2007 |
| JP | 2011250691 A | 12/2011 |
| JP | 2013150524 A | 8/2013 |
| JP | 2017229204 A | 12/2017 |
| JP | 2018164338 A | 10/2018 |

OTHER PUBLICATIONS

International Search Report and Written Opinion for Application No. PCT/US19/63332, dated Apr. 8, 2020 (14 pages).

Office Action for Japanese Patent Application No. 2021-531508, dated Oct. 25, 2022, with English Translation, 12 pages.

* cited by examiner

US 11,565,592 B2

AUXILIARY POWER OUTPUT FOR BATTERY MANAGEMENT SYSTEM

TECHNICAL FIELD

The present invention generally relates to utility carts having rechargeable batteries, and more particularly, but not exclusively, to a utility cart having a high voltage rechargeable battery.

BACKGROUND

The ability to provide power from a rechargeable battery pack in an auxiliary power mode in addition to a mode capable of providing motor power remains an area of interest. Some existing systems have various shortcomings relative to certain applications. Accordingly, there remains a need for further contributions in this area of technology.

SUMMARY

One embodiment of the present invention is a unique battery system for a utility car. Other embodiments include apparatuses, systems, devices, hardware, methods, and combinations for providing auxiliary power to a utility cart. Further embodiments, forms, features, aspects, benefits, and advantages of the present application shall become apparent from the description and figures provided herewith.

BRIEF DESCRIPTION OF THE DRAWINGS

The description herein makes reference to the accompanying figures wherein like reference numerals refer to like parts throughout the several views.

Figure 1:
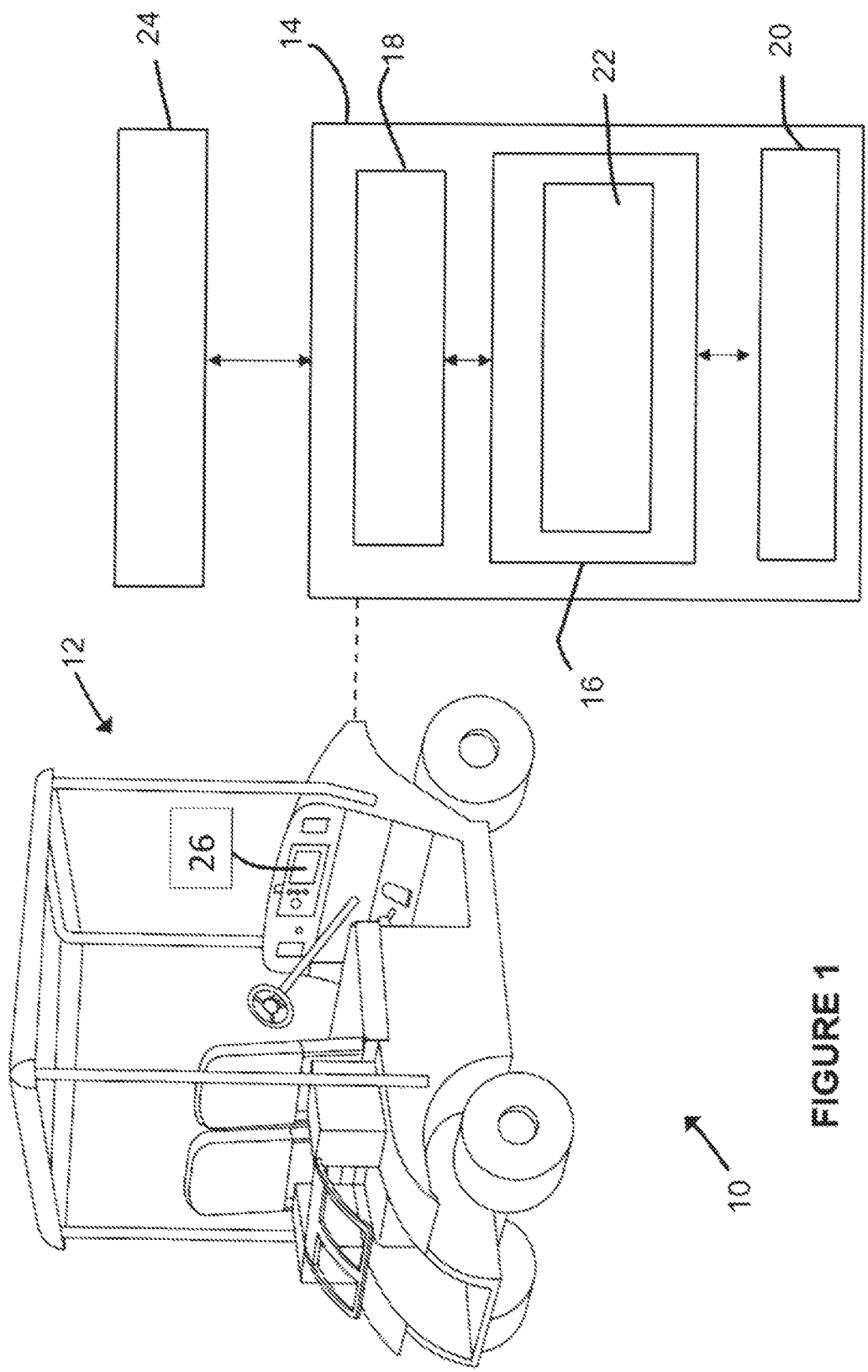
FIG. 1 illustrates a schematic representation of an exemplary vehicle system according to an illustrated embodiment of the subject application.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates a schematic representation of an exemplary vehicle system 10 according to an illustrated embodiment of the subject application. As illustrated, the exemplary vehicle system 10 can include a utility vehicle 12 having an associated vehicle control system 14. A variety of different types of vehicles can be used as the utility vehicle 12. Further, the utility vehicle 12 can be a motorized vehicle, such as, for example, a vehicle that is motorized or otherwise powered via use of electrical power, batteries, internal combustion engines, renewal energy sources, and/or combinations thereof, in addition to other manners of motorization. In one particular form, the utility vehicle 12 includes a lithium ion battery pack that is structured to provide electrical power used to power a motor of the utility vehicle 12 that provides a driving force for movement of the utility vehicle 12 and/or which provides electrical power for one or more electrical devices of the utility vehicle 12. Further, the utility vehicle 12 can be adapted for a variety of different types of applications and/or uses. For example, according to certain embodiments, the utility vehicle 12 is a motorized golf car or cart. Alternatively, or additionally, according to other embodiments, the utility vehicle 12 is a fully autonomous vehicle, relatively small all-terrain utility vehicle, a neighborhood vehicle, or any other similarly classed light utility passenger vehicle. Accordingly, it will be understood that descriptions found herein that mention "utility vehicle" are not to be construed as limited, but rather can be applied more broadly as set forth herein.

The vehicle control system 14, which can be positioned within and/or around the utility vehicle 12, can utilize a variety of different types of hardware and/or software. Additionally, the vehicle control system 14 can be configured to execute a variety of different computer based applications, including, for example, at least those discussed below with respect to FIGS. 2-6. Additionally, according to certain embodiments, the vehicle control system 14 can execute or otherwise rely upon various computer software applications, components, programs, objects, modules, and/ or data structures. Moreover, various applications, components, programs, objects, and/or modules, can be executed on one or more processors of the vehicle control system 14, or in another device or web-server network that is coupled to the vehicle control system 14.

According to the exemplary embodiment depicted in FIG. 1, the vehicle control system 14 includes a processing device 16, an input/output device 18, a memory 20, and an operating logic 22. Furthermore, as illustrated, the vehicle control system 14 can communicate with one or more external devices 24, as discussed below. The input/output device 18 can be any type of device that allows the vehicle control system 14 to communicate with the external device 24 and/or to otherwise receive/communicate instructions and/or information. For example, according to certain embodiments, the input/output device 18 can be a network adapter, network card, or a port (e.g., a USB port, serial port, parallel port, VGA, DVI, HDMI, FireWire, CAT 5, or any other type of port). The input/output device 18 can be comprised of hardware, software, and/or firmware. It is contemplated that the input/output device 18 includes more than one of these adapters, cards, or ports. Additionally, according to certain embodiments, the vehicle control system 14 can include, or otherwise be coupled to, one or more transceivers that are configured for communication with external devices 24, including, for example, via use of one or more wireless protocols or data streams, among other communication protocols.

The external device 24 can be any type of device that allows data to be inputted or outputted from the vehicle control system 14. To set forth just a few non-limiting examples, the external device 24 can be a handheld device, another computer, a server, a printer, a display, an alarm, an illuminated indicator, a keyboard, a mouse, mouse button, or a touch screen display. Furthermore, it is contemplated that, according to certain embodiments, the external device 24 can be integrated into the vehicle control system 14. For example, the vehicle control system 14 can be a smartphone, a laptop computer, or a tablet computer. Additionally, according to certain embodiments, the display of the external device 24, if any, may or may not be integrated with the vehicle control system 14 as one unit, which can be consistent with the general design of certain external devices 24, such as, for example, smartphones, laptop computers, tablet computers, and the like. It is further contemplated that there can be more than one external device in communication with the vehicle control system 14.

The processing device 16 can be of a programmable type, a dedicated, hardwired state machine, or a combination of these, and can further include multiple processors, Arithmetic-Logic Units (ALUs), Central Processing Units (CPUs), or the like. For forms of processing devices 16 with multiple processing units, distributed, pipelined, and/or parallel processing can be utilized as appropriate. The processing device 16 can be dedicated to performance of just the operations described herein, or can be utilized in one or more additional applications. In the depicted form, the processing device 16 is of a programmable variety that executes algorithms and processes data in accordance with the operating logic 22 as defined by programming instructions (such as software or firmware) stored in the memory 20. Alternatively or additionally, the operating logic 22 for the processing device 16 is at least partially defined by hardwired logic or other hardware. The processing device 16 can be comprised of one or more components of any type suitable to process signals received from the input/output device 18, the external device 24, or elsewhere, as well as provide desired output signals. Such components can include digital circuitry, analog circuitry, or a combination of both.

The memory 20 can be of one or more types, such as a solid-state variety, electromagnetic variety, optical variety, or a combination of these forms. According to certain embodiments, the memory 20 can represent a random access memory (RAM) device, supplemental levels of memory (e.g., cache memories, non-volatile or backup memories (e.g., programmable or flash memories)), read-only memories, or combinations thereof. Further, the memory 20 can be volatile, nonvolatile, or a mixture of these types, and some or all of the memory 20 can be of a portable variety, such as a disk, tape, memory stick, cartridge, or the like. Additionally, the memory 20 can store data that is manipulated by the operating logic 22 of the processing device 16, such as data representative of signals received from and/or sent to the input/output device 18 in addition to or in lieu of storing programming instructions defining the operating logic 22, just to name one example. As shown in FIG. 1, according to certain embodiments, the memory 20 can be included with the processing device 16 and/or coupled to the processing device 16. The memory 20 can store a variety of data, including, for example, at least data related to setting controls of one or more utility vehicles 10, among other data. In addition to the memory 20, the vehicle system 10 can include other memory located elsewhere in the vehicle system 10, such as cache memory in a CPU of an external device 24, as well as any storage capacity used as a virtual memory (e.g., as stored on a storage device or on another computer coupled to the vehicle system 10).

The external device 24 can have one or more similar characteristics of the vehicle control system 14 described above. No limitation is intended to confine the external device 24 to any particular type of device. Data from the external device 24 can be provided to the vehicle control system 14 using any variety of techniques. For example, data can be transmitted over a wired or wireless link, and/or a memory module (e.g. USB stick) can be removed from the external device 24 and connected to a vehicle control system 14. A combination of two or more of the above-mentioned techniques of conveying information from the external device 24 to the vehicle control system 14 are contemplated herein.

According to certain embodiments, the utility vehicle 12 can be configured to communicate information externally over external devices 24 that include one or more networks. The one or more networks can each include, or be in operable communication with, one or more computer networks, such as, for example, a local area network (LAN) including wireless LAN (i.e., Wi-Fi), a wide area network (WAN), a cellular network (e.g., 3G, 4G Long-Term Evolution (LTE), 5G, etc.), and/or the Internet, among other networks that are configured to send and/or receive data.

In the exemplary embodiment illustrated in FIG. 1, the utility vehicle 12 can include, or have operably coupled thereto, a navigation and positioning system (NPS), which can also be referred to as a telematics system and/or a respective telematics system(s). For example, according to certain embodiments, the NPS is a global position system (GPS) device that is mounted external to the utility vehicle 12, and/or an electronic horizon device that is connected to the utility vehicle 12. According to such embodiments, the NPS can be electronically connected to the vehicle control system 14 for the purpose of providing, and/or receiving information, including, for example, geographic location data, among other data. Further, according to certain embodiments, other additional information can be can be transmitted to/from the NPS and the vehicle control system 14.

In the illustrated embodiment of FIG. 1, the vehicle control system 14 can also be connected to a display 26, as such as, for example, a display 26 that is positioned for viewing by a user or operator of the utility vehicle 12. In certain embodiments, the display 26 can be a visual display computer unit (e.g., a monitor, a liquid crystal display (LCD) panel, organic light emitting diode (OLED) display panel, among others) such as a touch screen interactive display, that can display a variety of information, including, for example, information that is updated in real-time regarding the current location of the utility vehicle 12, as well as information pertaining to other utility vehicles.

The vehicle 12 can include an energy storage device used as a primary motive power source to drive the wheels. The energy storage device can take the form of a lithium-ion battery, and in one form is a lithium-ion battery pack. Various figures disclosed herein depict an embodiment of the energy storage system. The energy storage device used on the vehicle 12 can be configured to provide a main power output, as well as also provide one or more auxiliary power outputs. The auxiliary power outputs permit the vehicle 12 to configure the main power output in an off condition to preserve power, but otherwise provide power through the one or more auxiliary power outputs. The ability to provide main power or auxiliary power to the vehicle permits the elimination of a separate battery (e.g. the elimination of a 12 V battery).

Figure 2:
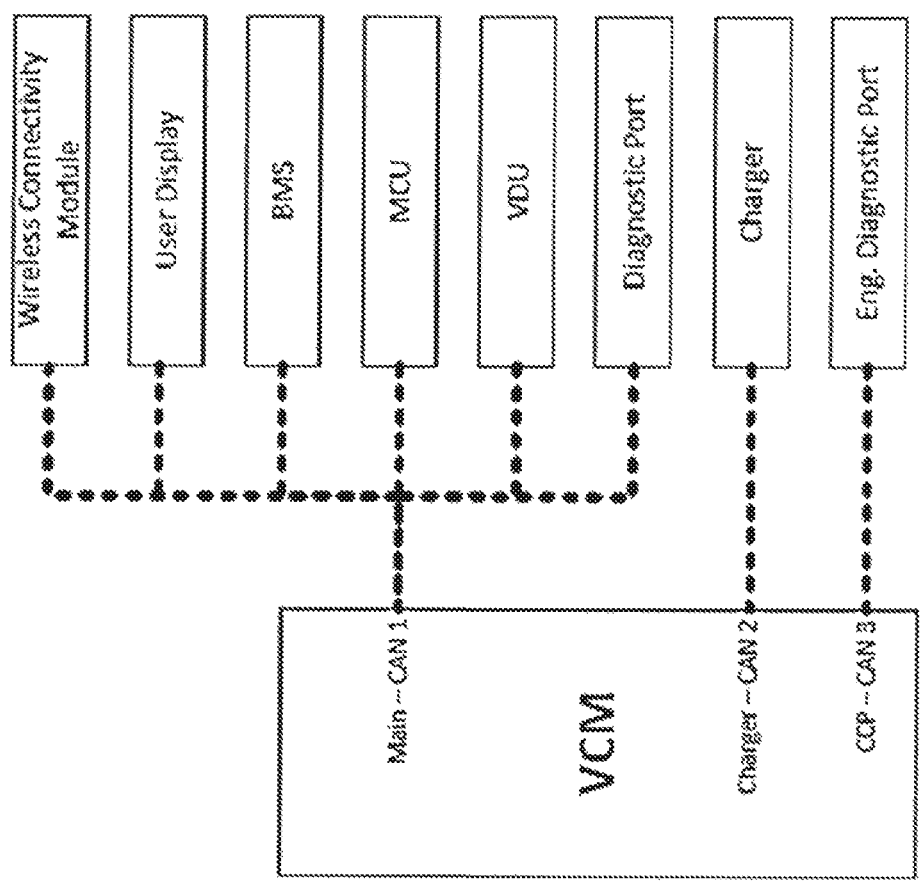
FIG. 2 illustrates a representation of exemplary subsystems of a vehicle control system according to an illustrated embodiment of the subject application.

FIG. 2 illustrates various components of the utility vehicle 12 that can be interconnected via network communication. In the illustrated embodiment the various components can be interconnected via CAN network, but other network configurations/protocols/etc are also contemplated herein. The illustrated embodiment includes three separate networks (e.g. CAN 1, CAN 2, and CAN 3), but other numbers of networks are also contemplated. As used herein, BMS denotes the Battery Management System, MCU denotes the Motor Controller, the VDU denotes the Visage Display Unit (also can be used as the telematics unit). Visage is available from Club Car, a maker of golf and other utility type carts from Augusta, Ga. As will be appreciated by those of skill in the art, Visage provides several functionalities including car tracking (real-time position, drive history, messaging, etc), car control (zone speed control, fleet lockdown, geofencing, maximum speeds, etc), power (battery status, fault code notifications, odometer, charge faults/interrupts, etc), and can provide other features too such as communications (food and beverage ordering, mobile app, tournament connect, etc). The illustrated embodiment includes a wireless connectivity module, but in some embodiments the VDU can also serve as the wireless connectivity module. Such module permits over the air communication, such as but not limited to software updates for the various devices of the vehicle 12. As used herein, the term "telematics" can include the integrated use of communications and information technology to store and receive information from telecommunications devices to remote objects. In some forms telematics can include any one or more of providing navigation and/or positioning information, transmission of navigation and/or positioning information, exchanging information between a central location and the vehicle, manage and monitor vehicle operations, fleet management, geofencing, etc. Communications can be over a cellular network, but other types of data transmission and reception are contemplated.

Figure 3:
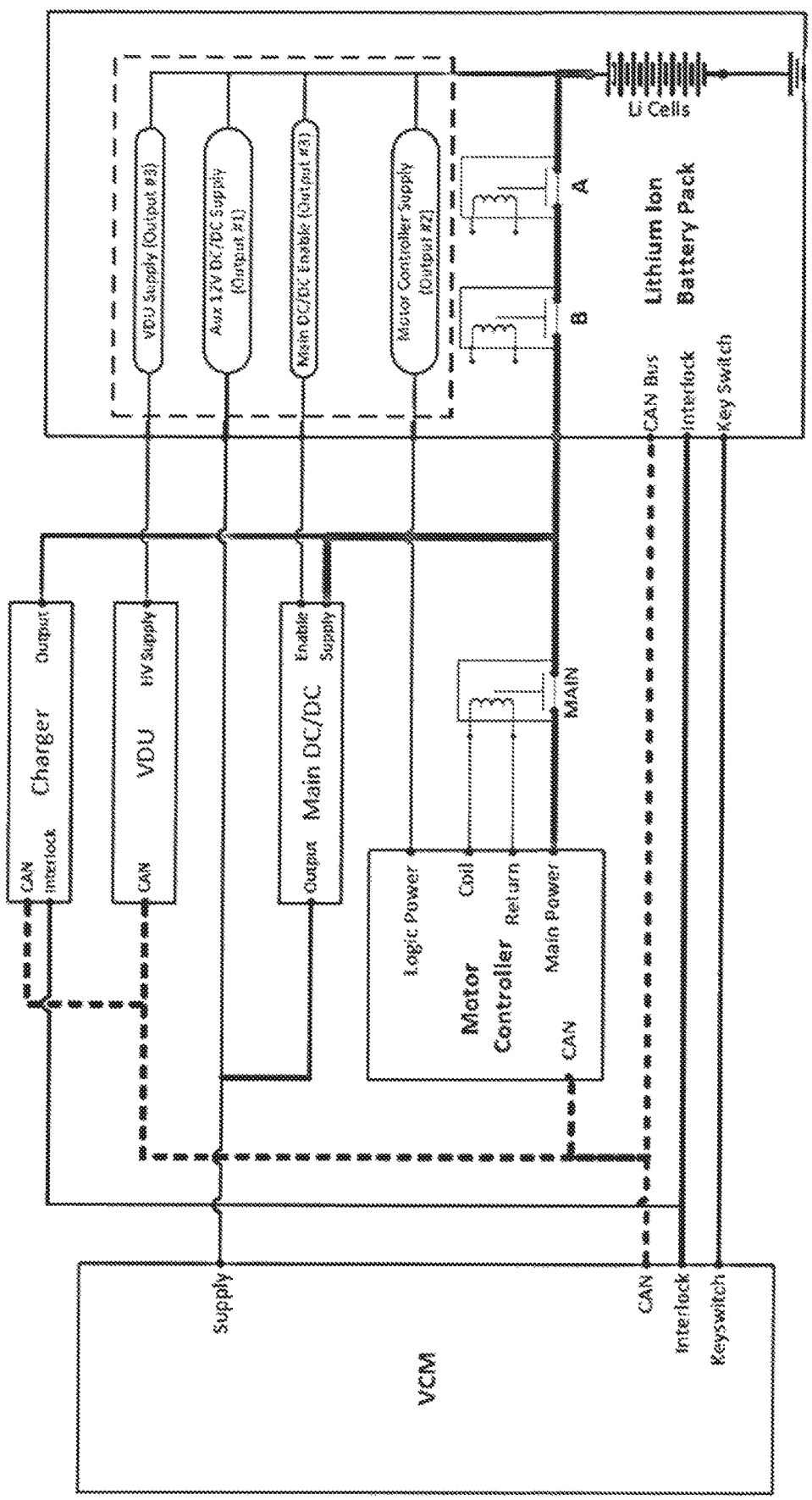
FIGS. 3 and 4 illustrate representations of exemplary architectures for subsystems of vehicle control systems that include an electronic battery control module that is coupled to a lithium ion battery pack.
Figure 4:
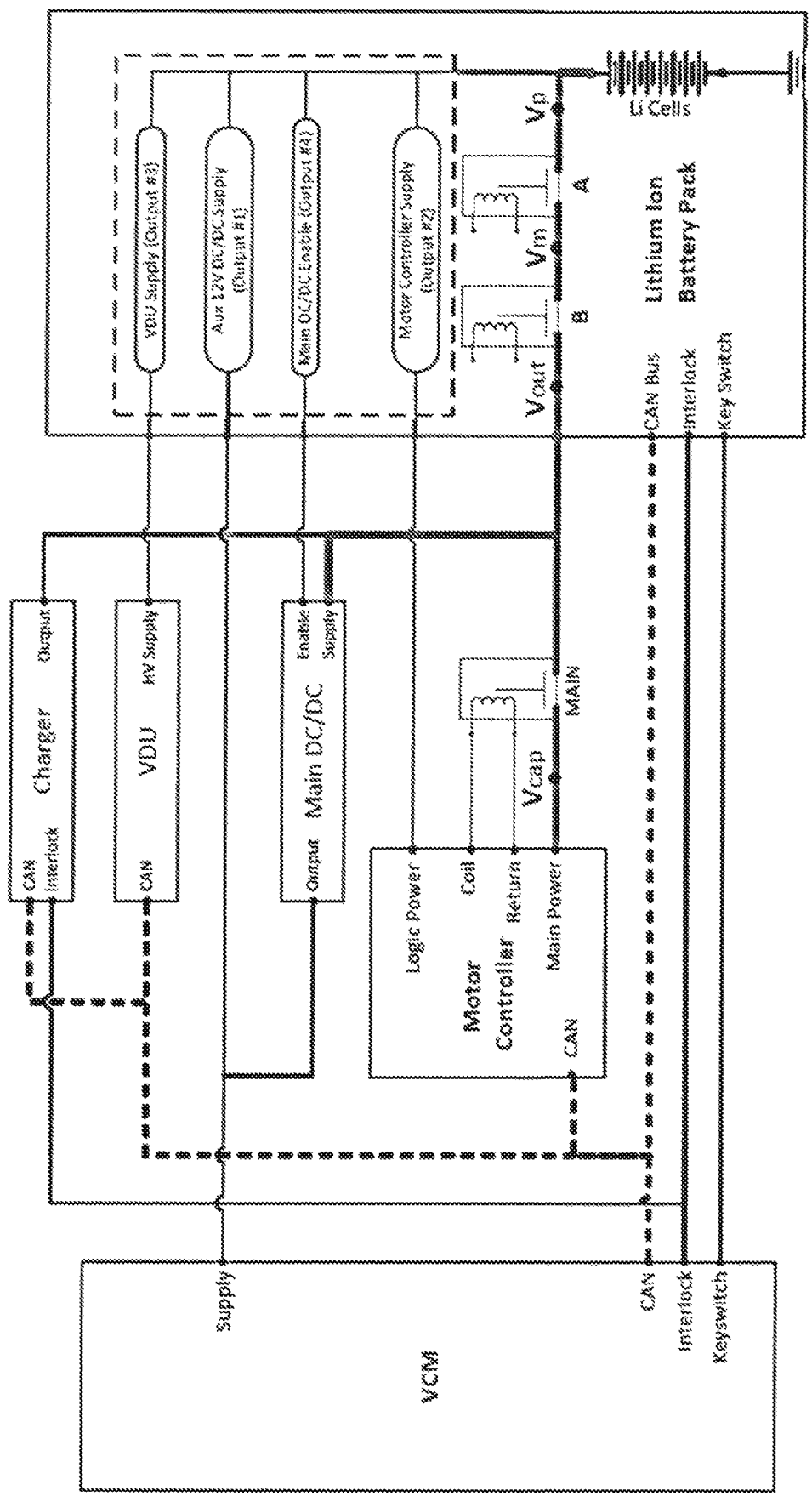
Figure 5:
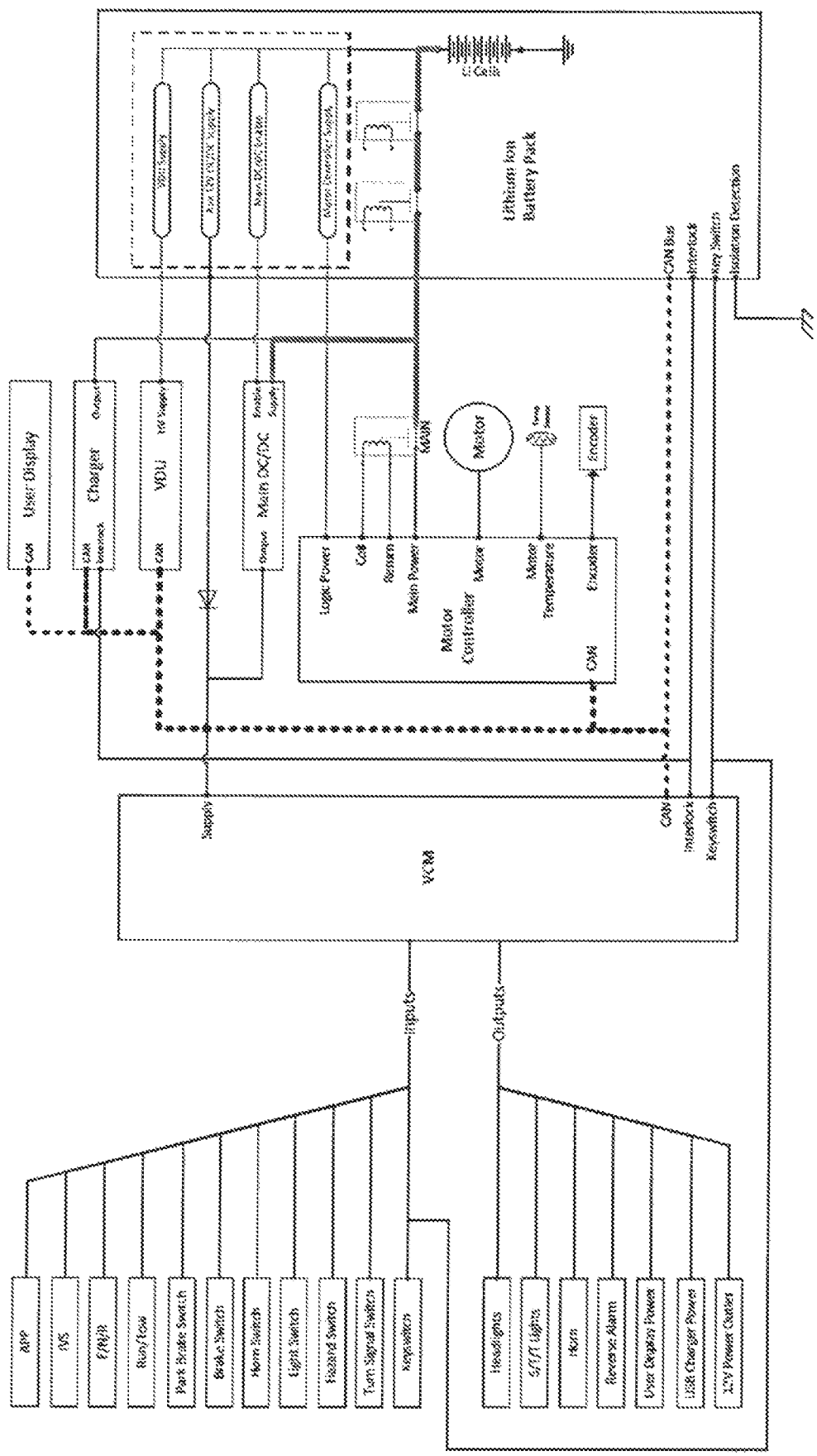
FIG. 5 illustrates a representation of an exemplary lithium/AC vehicle control system architecture that includes an electronic battery control module that is coupled to a lithium ion battery pack, and in which a vehicle control module outputs signals for a plurality of DC powered loads.

FIGS. 3 and 4 depicts a schematic of various components of the vehicle 12. The dashed line in FIGS. 3 and 4 within the Lithium Ion Battery Pack (also shown as a dashed line in the other figures depicting the Lithium Ion Battery Pack) represents components included in the BMS. One or more of these components can be included within the exterior housing of the energy storage system. As shown in FIGS. 3 and 4, the energy storage system includes a main power which is used to provide power to the Main Power of the MCU. Main power is at relatively high voltages and can be relative high power. Main power is also provided to the Main DC/DC. The Charger can also connected to the energy storage device through the main power output. The Main DC/DC can be used to supply power to various components as seen in FIG. 5 (components in the lower left corner of FIG. 5). The elimination of the Main DC/DC converter is also accompanied by the elimination of various devices structured to be driven from that device (see FIG. 6 where many of the components are missing).

The main power output of any of these figures can include at least one contactor between the Li-ion cells and the motor controller. Depicted in the illustrated embodiment are contactors A, B, and Main. Some embodiments can eliminate the Main contactor. Additionally and/or alternatively, some embodiments may include only a single contactor in the Battery Pack. When power is needed to drive the wheels of the vehicle 12, the contactors A, B, and Main will be closed. Use of the contactors requires an amount of electrical power which can be eliminated if the contactors remain in the open state. FIG. 4 depicts various voltages near the various contactors (Vcap, Vout, Vm, Vp), the importance of which will be discussed further below.

The battery pack is structured to provide at least one auxiliary output. In the illustrated embodiment the pack can provide a VDU supply output power useful to provide telematics capabilities when main power is disconnected through the contactors, an Auxiliary 12 V DC/DC output to power the VCM and any other low voltage device (e.g. the reverse alarm of FIG. 6), a Main DC/DC enable line, as well as a Motor Controller Supply which can be used to provide control signals and/or pre-charge to the capacitor bank of the MCU needed to provide power to the electric motor. The Motor Controller Supply auxiliary output can also be used to provide power to the MCU while the main power output is disconnected which can further enable communication between the battery pack and/or BMS while main power is OFF. It is contemplated that any number of auxiliary power outputs can be provided, including just a single output if desired. In most configurations it is contemplated that the battery pack includes at least the Aux 12V DC/DC Supply which can be used to provide power to the VCM when main power is not provided. The VCM is capable of providing supervisory control functions to various vehicle components, but other uses are also contemplated.

Figure 6:
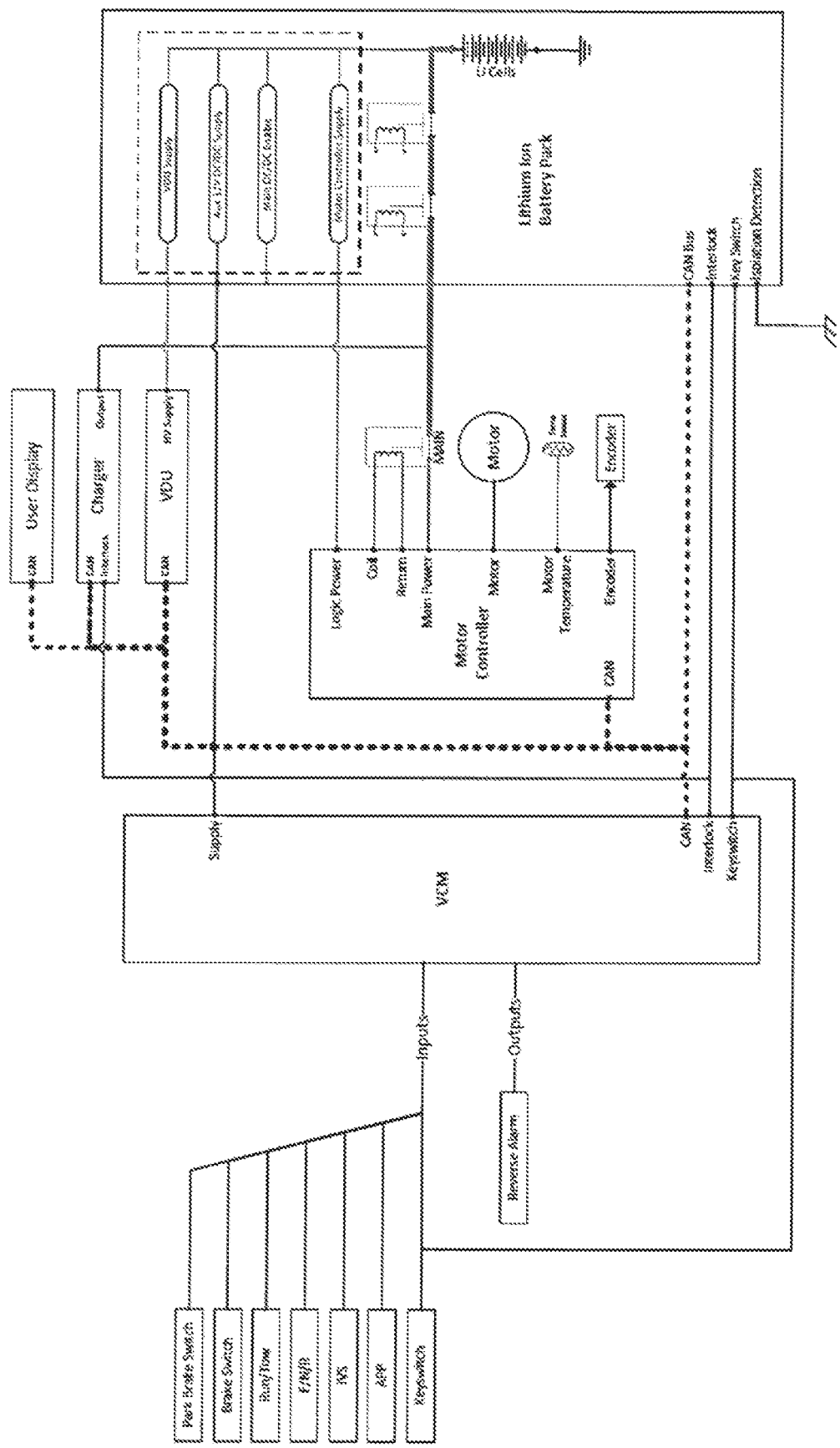
FIG. 6 illustrates a representation of an exemplary lithium/AC vehicle control system architecture that includes an electronic battery control module that is coupled to a lithium ion battery pack, and in which a user display receives power via an auxiliary DC/DC converter.
Figure 7:
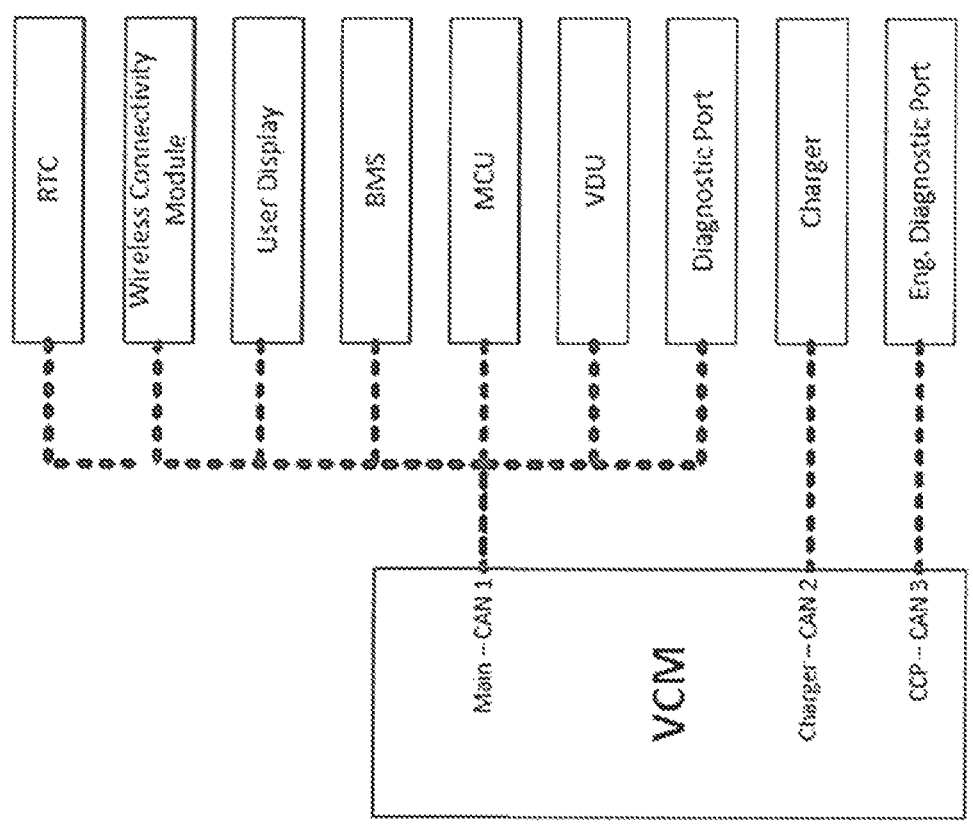
FIG. 7 illustrates a representation of exemplary subsystems of a vehicle control system according to an illustrated embodiment of the subject application.
Figure 8:
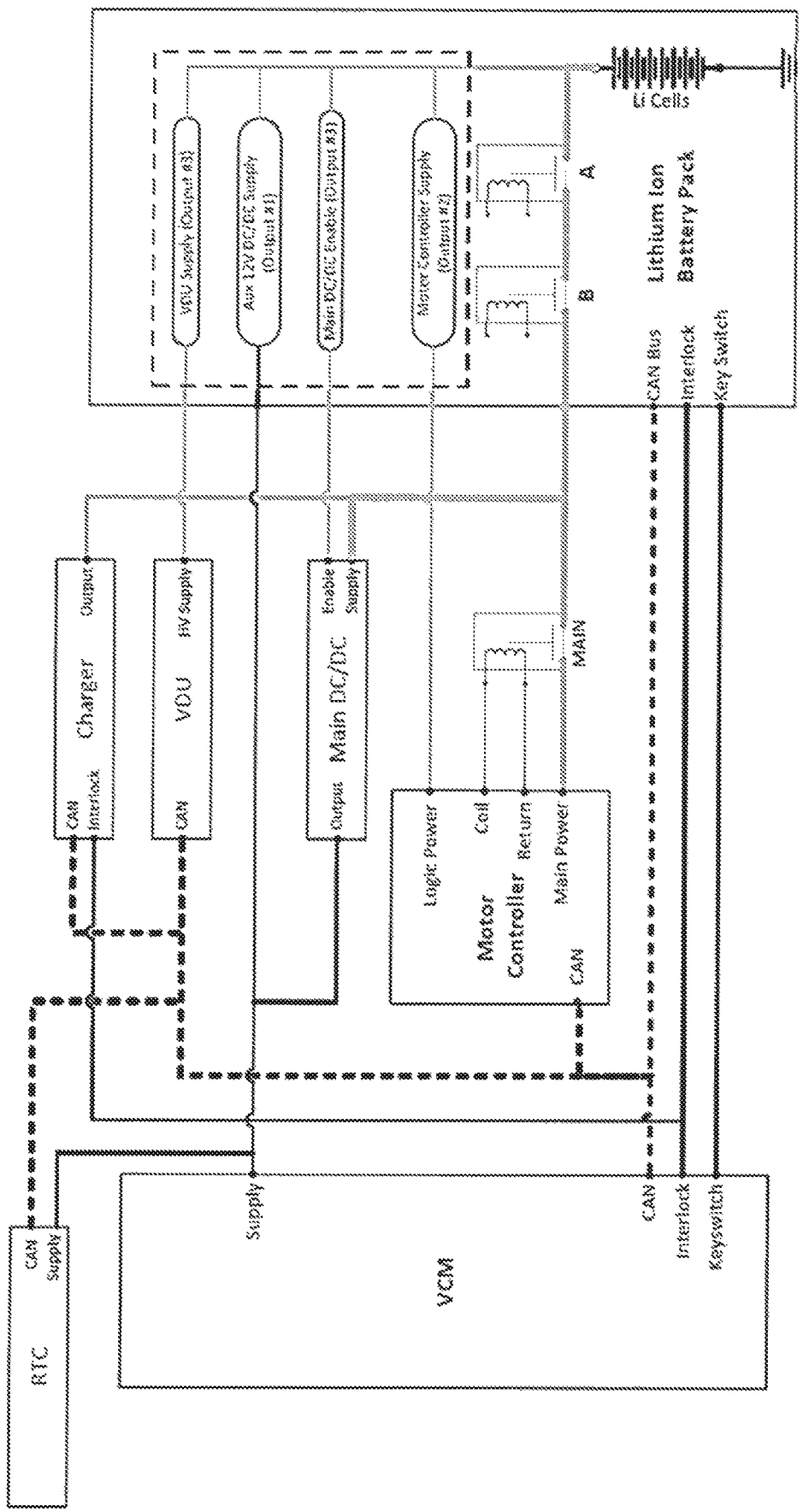
FIGS. 8 and 9 illustrate representations of exemplary architectures for subsystems of vehicle control systems that include an electronic battery control module that is coupled to a lithium ion battery pack.
Figure 9:
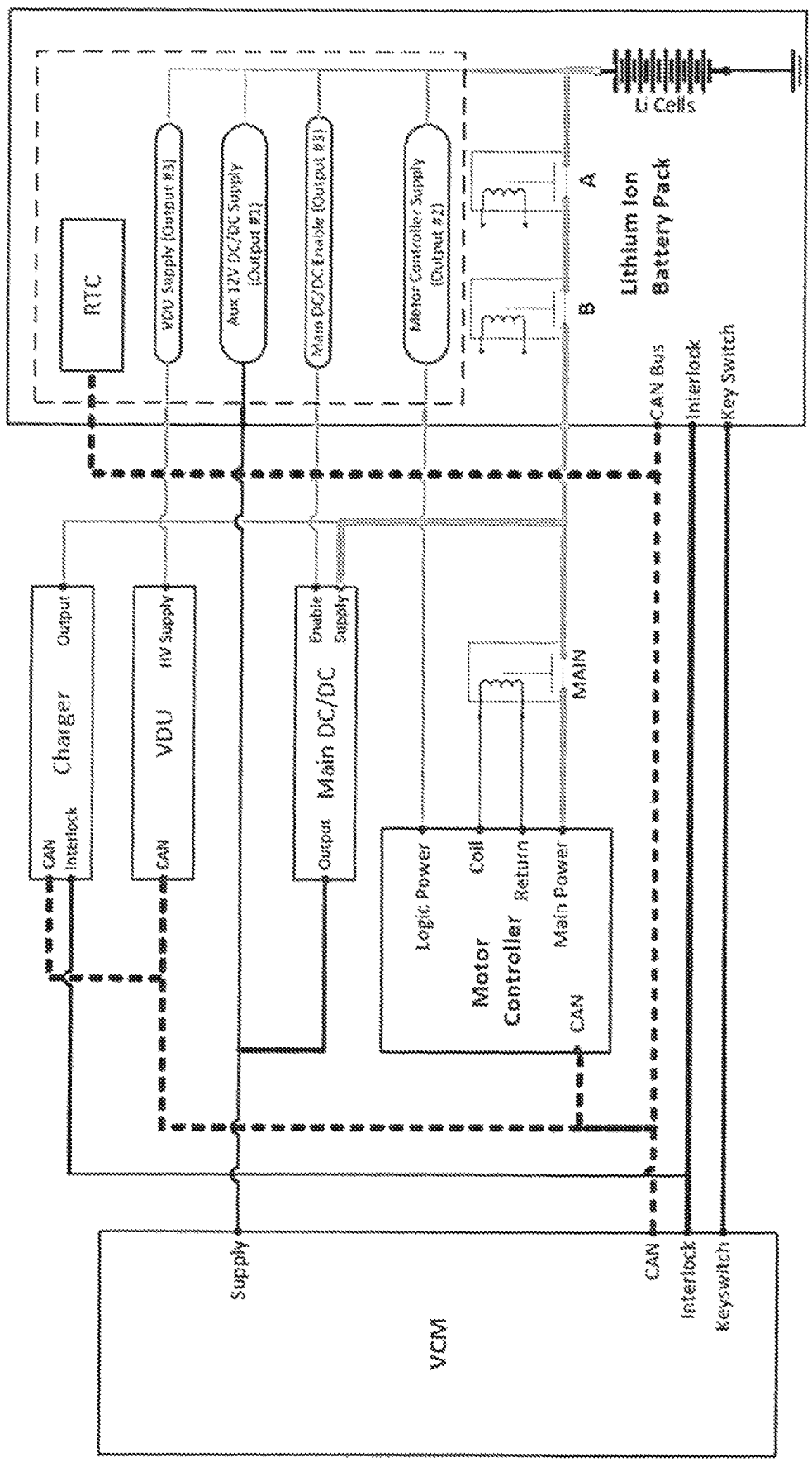
Figure 10:
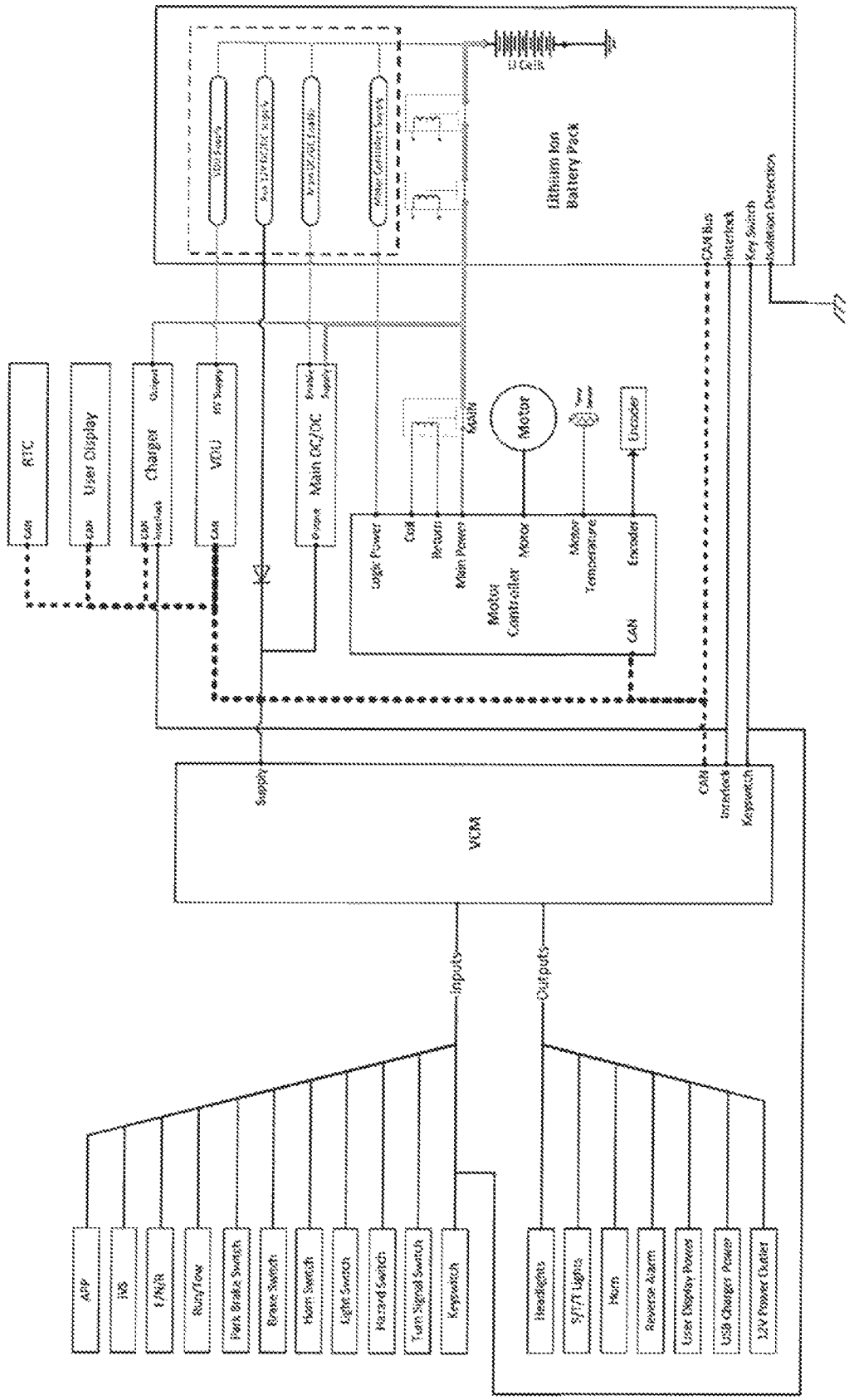
FIG. 10 illustrates a representation of an exemplary lithium/AC vehicle control system architecture that includes an electronic battery control module that is coupled to a lithium ion battery pack, and in which a vehicle control module outputs signals for a plurality of DC powered loads.
Figure 11:
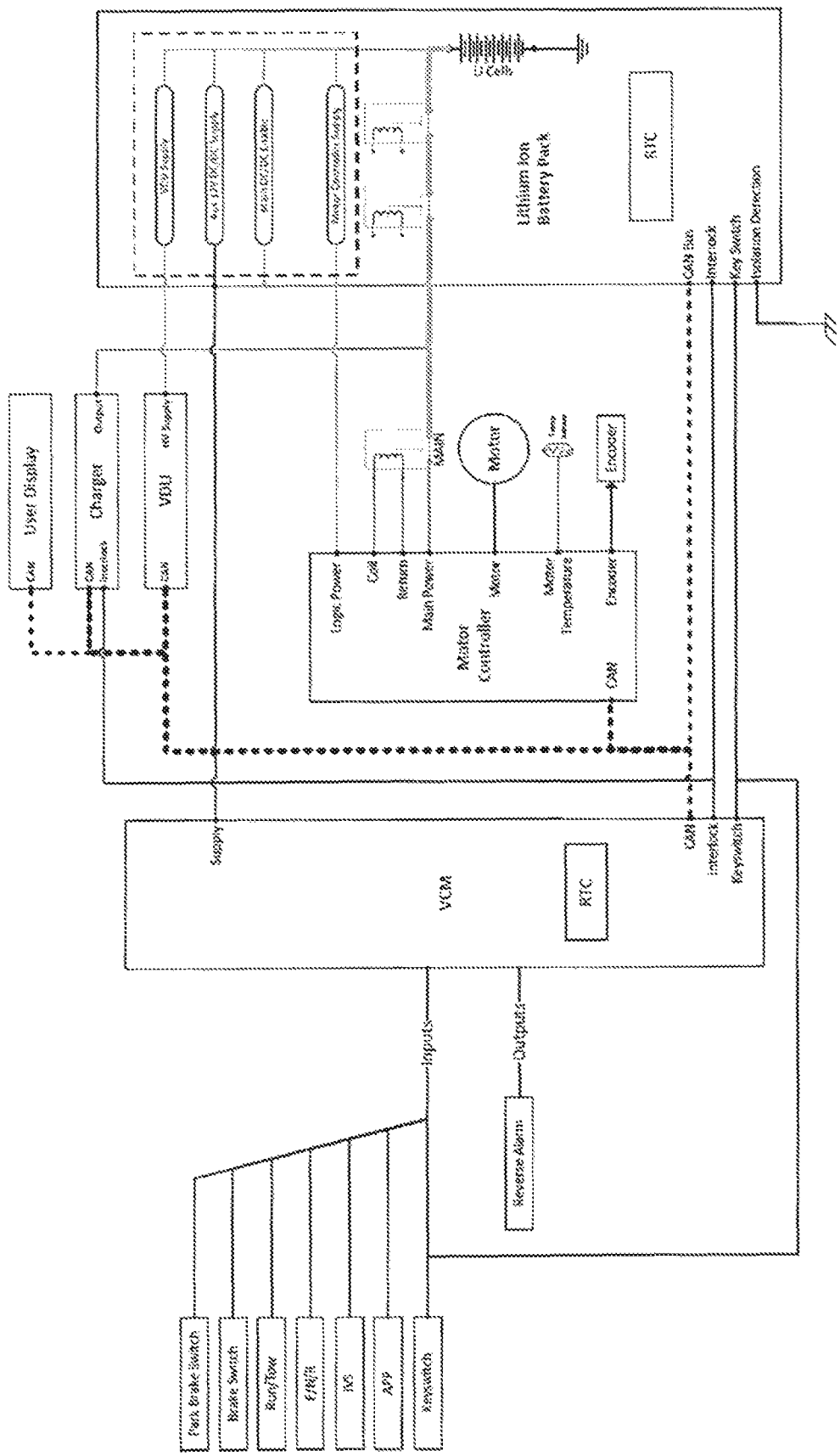
FIG. 11 illustrates a representation of an exemplary lithium/AC vehicle control system architecture that includes an electronic battery control module that is coupled to a lithium ion battery pack, and in which a user display receives power via an auxiliary DC/DC converter.

FIGS. 5 and 6 depict different architectures that can be deployed with various embodiments of the vehicles 12. FIG. 5 includes several components controlled by the VCM illustrated in the bottom left hand corner that are absent in FIG. 6. The components in FIG. 5 driven by outputs of the VCM can be powered from the Main DC/DC converter. Since FIG. 6 has eliminated the Main DC/DC converter, the components are also eliminated. As will be appreciated, as used herein the term "HV" denotes a high voltage generally intended to be a suitable voltage above 12V for powering a motor controller and electric motor. In some forms HV denotes 24V, while in others HV denotes 48V. Other voltages above 12V are also contemplated.

The auxiliary outputs of the illustrated embodiments enable the following functionality:
- Supply 12V power with main pack output disconnected
- Supply power to various HV accessories with main pack output disconnected
- Control a DC/DC converter
- Pre-Charge the HV Bus
- Walk away braking
- Contactor weld check Each of these capabilities provided by the auxiliary outputs are discussed below. It will be appreciated that the auxiliary outputs can provide power at the same or similar voltage as the main pack power output of the energy storage device, unless indicated to the contrary such as through a DC/DC converter shown in the figures which can be used to step down the voltage prior to being provided.

Supply 12V Power with Main Pack Output Disconnected

The 12V auxiliary output supplies 12V power without the need for a 12V battery on the vehicle.

Supply Power to Various HV Accessories with Main Pack Output Disconnected

The vehicle can have HV accessories that have low power draw. Auxiliary battery outputs can be used to provide switchable power to the accessories on an as needed basis as determined by the vehicle control system. In the current system, the HV accessory powered is the Visage system. Powering Visage independent of the pack contactors allows for telematics information about the vehicle to be reported continuously or at pre-defined intervals. Additionally, the Visage system is able to perform Over the Air (OTA) updates of vehicle components. In particular, the BMS can be updated, which has internal software rules that prevent updating when the pack main output is connected.

Control a DC/DC Converter

The vehicle can have a DC/DC converter(s) to generate 12V from pack voltage. The auxiliary battery output #4 (labelled in FIG. 3 as Output #3) allows the control system to: Disable the DC/DC converter when the pack main power output is disconnected (e.g. through use of the contactors) or weld check operations are occurring. Additionally, the control system (e.g. the BMS or the VCM) can turn on the DC/DC converter to use as a load to discharge the HV bus after the pack main power output has been disconnected.

HV Bus Pre-Charge

The High Voltage bus will be understood to be part of the motor drive and/or MCU. The motor controller (e.g. MCU) has a pre-charge circuit for charging its internal capacitor bank to pack voltage. The auxiliary output that powers the motor controller logic provides the power used for the pre-charge circuit. This allows the motor controller to pre-charge the HV bus on the vehicle without using a pre-charge circuit in the battery pack.

Walkaway Braking

Walkaway braking is the process of slowing the vehicle down to a slow crawl to let someone stop the vehicle if they have "walked away" from the vehicle without engaging the brake. The auxiliary output that supplies the motor controller logic supply allows the motor controller to detect vehicle movement when the pack main power output is disconnected (e.g. through use of one or more contactors). When movement is detected the vehicle control system (e.g. the MCU) enables the vehicle traction system to reduce vehicle movement if the brake is not engaged (e.g. the brake pedal and/or parking brake). For example, if the vehicle is at a stop and no accelerator pedal command is detected, if the vehicle control system senses movement of the motor then the vehicle traction system will be engaged to stop the motion.

An example of operating the vehicle traction system in this manner includes the following: the electrical machine that typically acts as the motor will be configured to be operated as a generator instead. If contactors are open when this occurs the vehicle control system will transmit a signal on the data bus to close any related contactors. Such a message can include a CAN bus message to the BMS for the BMS to close any contactors under its control. As shown in the illustrated embodiment, contactor A and contactor B which are in series relationship are within the control of the BMS and thus would be closed to configure for regenerative braking.

Contactor Weld Check for Drive

The vehicle control system monitors various voltages reported over CAN from the BMS and Motor Controller. The voltages consist of: motor controller input cap voltage (Vcap), pack output voltage (at the external battery terminals, or Vout), pack internal voltage (Vp), and the voltage between the two series connected pack contactors (Vm). Using the motor controller pre-charge circuit, the vehicle control system is able to determine if any of the contactors are welded. The check consists of one or both of the following: If Vcap−Vout>a threshold, then the voltages are not tracking one another and it can be assessed that the contactor is not welded. If Vcap−Vm>a threshold (can be the same or different as the earlier threshold), then the voltages are not tracking one another and it can be assessed that the contactor is not welded. If either or both of these conditionals are not met, either set an error for later diagnosis or disable the system. This check can be determined over a defined period of time in which the condition must be met over the time period. Since data is transmitted over the bus, the contactor weld check for drive can be performed in any number of components.

Contactor Weld Check for Charge

The vehicle control system monitors various voltages reported over CAN from the BMS, Motor Controller, and vehicle charger. The voltages consist of: motor controller input cap voltage (Vcap), charger output voltage (Vcharger_output), pack output voltage (at the external battery terminals, or Vout), pack internal voltage (Vp), and the voltage between the two series connected pack contactors (Vm). Using the motor controller pre-charge circuit, the vehicle control system is able to determine if any of the contactors are welded. If no contactors are welded, the vehicle control system turns the charger output on at a low voltage and current to detect if the charging circuit is open or short circuited. The check consists of the following: check for open circuit or short circuit condition. If either or both of these conditionals are met, either set an error for later diagnosis or disable the system. Next, if absolute value of (Vcharger_output−Vout)<threshold) AND (Vout>another threshold), this indicates that the contactors are not welded. This check can be determined over a defined period of time in which the condition must be met over the time period. Since data is transmitted over the bus, the contactor weld check for drive can be performed in any number of components.

It will be appreciated that any of the functions made available by the auxiliary outputs from the battery pack listed immediately above can be combined with any of the other functions.

Also, as used herein, the "vehicle control system" can include one or more of any of the various components discussed such as the VCM, BMS, MCU, VDU, etc. As will be appreciated given the description herein, the vehicle control system can control various components of the utility cart described herein. For example, the BMS can control the contactors associated with the battery, such as for example the contactor A and B. In some forms the BMS can receive a command from the VCM to open or close either or both of the contactors A and B in light of operation of a mode described above (e.g. contactor weld check). The VCM can further command the MCU to open or close the main contactor. In still further forms, the VCM can be used to request the BCM send power over the auxiliary power outlet to enable/disable the main DC/DC converter. In some forms the VCM can broadcast a state or mode of the utility cart over the network and any of the MCU, BMS, etc can control individual components. In other forms the VCM can broadcast commands for individual components from which any of the MCU, BMS, etc can respond by confirming and issuing commands to the individual components.

Though the above description specifically mentioned FIGS. 2-6, any of the embodiments discussed herein with respect to the auxiliary power outputs of the battery can be used with any of FIGS. 2-11, including any combinations thereof. The RTC illustrated in FIGS. 7-11 relate to a real-time clock useful to provide time for scheduling activities in the utility cart.

A high voltage bus referred to herein can take a number of forms, one of which includes the MCU, Main DC/DC converter, and/or the Charger.

The BMS can be used to control the contactors within the battery pack.

One aspect of the present application includes an apparatus comprising a utility cart having an energy storage device in selective powered communication with an electrical motor, the electrical motor coupled with at least one driven wheel, the energy storage device structured to provide electrical power to the electrically powered drive train to provide motion of the utility cart, the energy storage device coupled with a management system and capable of providing a main power output at a first voltage level sufficient to power the electric motor and also capable of providing an auxiliary power output.

A feature of the present application includes wherein the utility cart is a golf cart.

Another feature of the present application includes wherein the energy storage device is a lithium-ion battery.

Yet another feature of the present application includes wherein the lithium-ion battery is a lithium ion battery pack.

Still another feature of the present application includes wherein the auxiliary power output includes a plurality of auxiliary power outputs.

Yet still another feature of the present application includes wherein the auxiliary power output is structured to provide power at a second voltage lower than the first voltage.

Still yet another feature of the present application includes wherein the lithium ion battery pack includes a DC/DC converter structured to step down the voltage of the lithium ion battery pack, and wherein the auxiliary power output provides output power from the DC/DC converter.

A further feature of the present application includes wherein the lithium ion battery pack includes an external housing and includes the management system.

A yet further feature of the present application further includes a vehicle control module structured to receive power from the auxiliary power output.

A still yet further feature of the present application further includes a motor controller structured to receive power from at least one of the auxiliary power output.

A yet still further feature of the present application includes wherein the motor controller is structured to receive power from the auxiliary power output when the main power output is disconnected from the motor controller.

Yet another feature of the present application further includes a telematics device structured to receive power from at least one of the auxiliary power output.

Yet another feature of the present application includes a main DC/DC converter structured to receive power from the main power output.

Yet another feature of the present application includes wherein the lithium-ion battery pack includes a contactor coupled to the main power output and is structured to open and close to selective provide power to the main power output.

Yet another feature of the present application includes wherein the motor controller includes a walk-away braking mode structured to detect the utility cart is in an uncommanded motion of the at least one wheel and enable a traction system on the vehicle to slow the motion of the at least one wheel.

Yet another feature of the present application includes wherein the walk-away braking mode is enabled when a contactor of the energy storage device is in the OFF condition such that main power output is disabled.

Yet another feature of the present application includes wherein the main DC/DC converter is structured to further receive power from the motor controller to discharge the motor controller.

Yet another feature of the present application includes wherein the auxiliary power output is a motor controller supply output, wherein the motor controller includes a pre-charge circuit structured to pre-charge a bus in preparation for motor engagement, the pre-charge circuit apart from the main and structured to receive power from the motor controller supply output.

Yet another feature of the present application includes wherein the motor controller supply output is structured to provide power when the main power output is turned OFF.

Yet another feature of the present application includes wherein the energy storage device includes a first contactor selectively commanded between an ON and OFF condition.

Yet another feature of the present application includes wherein the energy storage device includes a second contactor in serial communication with the first contactor.

Yet another feature of the present application includes wherein a main contactor is used on the main power output of the energy storage device.

Yet another feature of the present application includes a contactor weld check for drive.

Yet another feature of the present application includes a contactor weld check for charge.

Yet another feature of the present application includes wherein the contactor weld check for charge is based on a conditional that: (1) the absolute value of output voltage of the charger minus the output voltage of the energy storage device is above a threshold; and (2) output voltage of the energy storage device is above another threshold.

Yet another feature of the present application includes wherein the contactor weld check for drive is based on a conditional of a voltage of the capacitor minus the voltage of the energy storage system output voltage is greater than a threshold.

Yet another feature of the present application includes wherein the contactor weld check for drive is based on a conditional of a voltage of the capacitor bank (Vcap in the figures) minus the voltage of the energy storage system output voltage (Vout in the figures) is greater than a threshold.

Another aspect of the present application includes an apparatus comprising a utility cart having an energy storage device in selective powered communication with an electrical motor, the electrical motor coupled with at least one driven wheel, the energy storage device structured to provide electrical power to the electrically powered drive train to provide motion of the utility cart, the energy storage device coupled with a management system and capable of providing a main power output at a main voltage level sufficient to power the electric motor, a first auxiliary power output at a first auxiliary voltage level that is at a lower voltage level than the main voltage level, and a second auxiliary power output at a second auxiliary voltage level.

A feature of the present application includes wherein the energy storage device is a lithium-ion battery pack which includes a DC/DC converter structured to step down the voltage of the lithium-ion battery pack, and wherein the auxiliary power output provides output power from the DC/DC converter, the lithium-ion battery pack including an external housing, and wherein the utility cart includes a battery management system structured to control the lithium-ion battery pack.

Another feature of the present application further includes a vehicle control module and a motor controller, the motor controller structured to regulate power to the electric motor, the vehicle control module structured to receive power from the first auxiliary power output and the motor controller structured to receive power from the second auxiliary power output, the motor controller structured to receive power from the second auxiliary power output when a main power output from the lithium-ion battery pack is disconnected from the motor controller.

A further feature of the present application includes wherein the motor controller includes a walk-away braking mode structured to detect when the utility cart is in an uncommanded motion of the at least one wheel and enable a traction system on the utility cart to slow the motion of the at least one wheel, wherein the walk-away braking mode is enabled when a contactor of the energy storage device is in the OFF condition such that main power output is disabled.

A yet further feature of the present application includes wherein the second auxiliary power output is a motor controller supply output, wherein the motor controller includes a pre-charge circuit structured to pre-charge a bus in preparation for motor engagement, the pre-charge circuit apart from the main and structured to receive power from a motor controller power supply via the second auxiliary power output, wherein the motor controller supply output is structured to provide power when the main power output is turned OFF, and which further includes a third auxiliary power output having a third auxiliary power output at the same voltage as the main power output, the third auxiliary power output structured to provide power to a display unit.

A still further feature of the present application includes wherein the first auxiliary power output is provided from an auxiliary DC/DC converter of the energy storage device, and which further includes a main DC/DC converter apart from the energy storage device structured to receive power from the main power output of the energy storage device, wherein the lithium-ion battery pack includes a contactor coupled to the main power output and is structured to open and close to selective provide power to the main power output.

A still yet further feature of the present application includes wherein the main DC/DC converter is structured to further receive power from the motor controller to discharge the motor controller when main power output has been selectively turned to an OFF condition.

A yet still further feature of the present application includes wherein the energy storage device includes a first contactor in serial electrical connection with a second contactor, each of the first contactor and second contactor selectively commanded between an ON and OFF condition, wherein the utility cart includes a main contactor in electric connection with the main power output of the energy storage device.

Yet still another feature of the present application includes wherein the utility cart further includes a vehicle control module structured to perform at least one contactor weld check of any of the main contactor, first contactor, and second contactor, the vehicle control module structured to receive voltage information from a communication bus of the utility car for purposes of performing the at least one contactor weld check, the communication bus structured to convey any of the following for use in the contactor weld check: electric motor controller capacitor bus voltage, energy storage output voltage, energy storage internal voltage, voltage between the first contactor and second contactor, and charger voltage.

Still yet another feature of the present application includes wherein the second auxiliary voltage output is a main DC/DC converter enable output structured to communicate with the main DC/DC converter to place the main DC/DC converter in an OFF state during the contactor weld check and to place the main DC/DC converter in an ON state when main power output has been selectively turned to an OFF condition and the motor controller is configured to discharge through the DC/DC converter.

Yet another aspect of the present application includes an apparatus comprising a utility cart having a plurality of rotatable wheels for transporting the utility cart between points, the utility cart having: an electric motor coupled with and structured to provide motive power to a drive wheel of the plurality of wheels, and an on-board energy storage device structured to provide electrical power to the electric motor, the energy storage device having a main power output at a main power voltage level connected with the electric motor and structured to provide power at a main power level, the energy storage device also including a plurality of auxiliary power outputs structured to provide power at a plurality of direct current voltages, each of the plurality of power outputs structured to provide power lower than the main power level.

A feature of the present application includes wherein the utility cart further includes a motor controller, and wherein at least one of the plurality of auxiliary power outputs is structured to provide a logic power to the motor controller when a main power is not provided to the motor controller, the motor controller structured to operate on the basis of the logic power when main power is not provided to the motor controller, the logic power at least partially consumed by the motor controller to power an encoder useful to detect motion of at least one of the plurality of wheels when the main power is not provided to the motor controller, a signal from the encoder used by the motor controller to apply regenerative braking to resist the motion of the at least one of the plurality of wheels.

Another feature of the present application includes wherein the logic power is provided at the main power voltage level.

Yet another feature of the present application includes wherein the motor controller includes a capacity bus, and wherein the motor controller is also structured to pre-charge the capacitor bus via the logic power delivered over the at least one of the plurality of auxiliary power outputs.

Still another feature of the present application includes wherein the utility cart further includes a cart DC/DC converter structured to receive power from the main power output of the on-board energy storage device, and wherein the on-board energy storage device includes an internal DC/DC converter structured to provide DC power through at least one of the plurality of auxiliary power outputs.

Yet still another feature of the present application includes wherein at least one of the plurality of auxiliary power outputs is an enable/disable power output in electrical communication with the cart DC/DC converter structured to selectively turn the cart DC/DC converter between an ON state and an OFF state.

Still yet another feature of the present application includes wherein the main power output of the on-board energy storage device is structured to be switched between an ON state and an OFF state, and wherein the cart DC/DC converter provides primary power to at least one DC powered component of the utility cart when main power output from the on-board energy storage device is ON.

A further feature of the present application includes wherein the utility cart includes a cart contactor oriented in a switchable electrical power connection between the on-board energy storage device and a motor controller, wherein the energy storage device includes a device contactor in a switchable electrical power connection with the cart contactor, wherein the utility cart includes a contactor weld check mode which includes placing the cart DC/DC converter in an OFF state via the enable/disable power output during the contactor weld check mode.

A still further feature of the present application includes wherein the utility cart further includes another device contactor in a switchable electrical power connection with the cart contactor, the device contactor and the another device contactor in series relationship, wherein the utility cart further includes a communications network over which is passed voltages measured by a battery management system and the motor controller, wherein the communications network is structured to pass two or more of the following: capacitor bank voltage of the motor controller, pack output voltage at external battery terminals of the on-board energy storage device, internal pack voltage, voltage between the device contactor and the another device contactor, charger output voltage of a charger configured to provide an electric charge to the on-board energy storage device.

A still further feature of the present application includes wherein the contactor weld check includes determining if any of the contactors including the cart contactor, device contactor, and the another device contactor are welded, the contactor weld check including at least one of the following weld checks: (1) a contactor weld check for drive structured to determine that the contactors are not welded if at least one of the following conditionals are met: (a) a difference between capacitor bank voltage and pack output voltage is greater than a first threshold; and (b) a difference between a capacitor bank voltage and the voltage between the device contactor and the another device contactor is greater than a second threshold, and (2) a contactor weld check for charge structured to determine that the contactors are not welded if both of the following conditionals are true: (a) the absolute difference between charger output voltage and pack output voltage is less than a third threshold; and (b) pack voltage is greater than a fourth threshold.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. An apparatus comprising:
a utility cart having an energy storage device in selective powered communication with an electric motor coupled with at least one driven wheel so that the energy storage device can provide electrical power that powers motion of the utility cart, wherein the energy storage device is coupled with a battery management system and capable of providing a main power output at a main voltage level sufficient to power the electric motor, a first auxiliary power output at a first auxiliary voltage level that is at a lower voltage level than the main voltage level, and a second auxiliary power output at a second auxiliary voltage level; and
a DC/DC converter configured to step down voltage output by a battery pack of the energy storage device to produce the main voltage level, the first auxiliary voltage level, the second auxiliary voltage level, or any combination thereof.

2. The apparatus of claim 1, wherein the battery pack is a lithium-ion battery pack including an external housing that houses the lithium-ion battery pack and the DC/DC converter.

3. The apparatus of claim 2, further comprising:
a vehicle control module configured to be powered by the first auxiliary power output; and
a motor controller configured to regulate power to the electric motor wherein the motor controller receives power from the second auxiliary power output when a main power output from the lithium-ion battery pack is disconnected from the motor controller.

4. The apparatus of claim 3, wherein the motor controller includes a walk-away braking mode configured to:
detect when the at least one driven wheel of the utility cart is in an uncommanded motion; and
enable a traction system on the utility cart to slow the motion of the at least one driven wheel, wherein the walk-away braking mode is enabled when a contactor of the energy storage device is in an OFF condition such that main power output is disabled.

5. The apparatus of claim 3, wherein:
the second auxiliary power output is a motor controller supply output,
the motor controller includes a pre-charge circuit separated from the main power output, but connected to the second auxiliary power output and configured to pre-charge a bus in preparation for motor engagement, and the motor controller supply output is configured to provide a third auxiliary power output when the main power output is off, the third auxiliary power output having a third auxiliary voltage level equal to the main power output so that the third auxiliary power output can power a display unit.

6. The apparatus of claim 1, wherein the first auxiliary power output is provided from an auxiliary DC/DC converter of the energy storage device, and the DC/DC converter is a main DC/DC converter separate from the energy storage device and configured to receive power from the main power output of the energy storage device, wherein the battery pack includes a contactor coupled to the main power output that is configured to open and close to selectively provide power to the main power output.

7. The apparatus of claim 6, wherein the main DC/DC converter is configured to further receive power from a motor controller to discharge the motor controller when the main power output has been selectively turned to an OFF condition.

8. The apparatus of claim 7, wherein:
the energy storage device includes a first contactor in serial electrical connection with a second contactor, each of the first contactor and the second contactor is selectively commanded between an ON and an OFF condition, and
wherein the utility cart includes a main contactor in electric connection with the main power output of the energy storage device.

9. The apparatus of claim 8, wherein the utility cart further includes:
a vehicle control module configured to perform at least one contactor weld check of any of the main contactor, the first contactor, and the second contactor, wherein the vehicle control module is configured to receive voltage information from a communication bus of the utility cart for purposes of performing the at least one contactor weld check, the communication bus being configured to convey one or more of the following for use in the at least one contactor weld check: electric motor controller capacitor bus voltage, energy storage output voltage, energy storage internal voltage, voltage between the first contactor and the second contactor, and charger voltage.

10. The apparatus of claim 9, wherein the second auxiliary power output is configured to communicate with the main DC/DC converter to place the main DC/DC converter in an OFF state during the at least one contactor weld check and to place the main DC/DC converter in an ON state when the main power output has been selectively turned to the OFF condition and the motor controller is configured to discharge through the DC/DC converter.

11. An apparatus comprising:
a utility cart having a plurality of rotatable wheels for transporting the utility cart between points, the utility cart having:
an electric motor configured to provide motive power to a drive wheel of the plurality of rotatable wheels to which it is coupled;
an on-board energy storage device configured to provide electrical power to the electric motor, the energy storage device having a main power output at a main power voltage level connected with the electric motor and configured to provide power at a main power level, the energy storage device also including a plurality of auxiliary power outputs configured to provide power at a plurality of direct current voltages, each of the plurality of auxiliary power outputs configured to provide power lower than the main power level; and
a DC/DC converter configured to step down voltage output by a battery pack of the energy storage device to produce the main power level, the plurality of direct current voltages, or any combination thereof.

12. The apparatus of claim 11, wherein the utility cart further includes:
a motor controller that receives at least one of the plurality of auxiliary power outputs as a logic power when a main power is not provided to the motor controller, wherein the logic power is at least partially consumed by the motor controller to power an encoder that can detect motion of at least one of the plurality of rotatable wheels when the main power is not provided to the motor controller so that the motor controller can apply regenerative braking to resist detected motion.

13. The apparatus of claim 12, wherein the logic power is provided at the main power voltage level.

14. The apparatus of claim 12, wherein the motor controller includes a capacitor bus, and wherein the motor controller is configured to pre-charge the capacitor bus via the logic power delivered over the at least one of the plurality of auxiliary power outputs.

15. The apparatus of claim 11, wherein the DC/DC converter is a cart DC/DC converter configured to receive power from the main power output of the on-board energy storage device, and wherein the on-board energy storage device includes an internal DC/DC converter configured to provide DC power through at least one of the plurality of auxiliary power outputs.

16. The apparatus of claim 15, wherein the at least one of the plurality of auxiliary power outputs is an enable/disable power output in electrical communication with the cart DC/DC converter configured to selectively turn the cart DC/DC converter between an ON state and an OFF state.

17. The apparatus of claim 15, wherein the main power output of the on-board energy storage device is configured to be switched between an ON state and an OFF state, and wherein the cart DC/DC converter provides primary power to at least one DC powered component of the utility cart when the main power output from the on-board energy storage device is in the ON state.

18. The apparatus of claim 17, wherein:
the utility cart includes a cart contactor between the on-board energy storage device and a motor controller of the utility cart,
the energy storage device includes a device contactor in a switchable electrical power connection with the cart contactor, and
the utility cart includes a contactor weld check mode which includes placing the cart DC/DC converter in an OFF state via an enable/disable power output during the contactor weld check mode.

19. The apparatus of claim 18, wherein the utility cart further comprises:
another device contactor in a switchable electrical power connection with the cart contactor, the device contactor and the another device contactor in series relationship; and
a communications network over which voltages measured by a battery management system and the motor controller are passed, wherein the communications network is configured to pass two or more of the following: capacitor bank voltage of the motor controller, pack output voltage at external battery terminals of the on-board energy storage device, internal pack voltage, voltage between the device contactor and the another device contactor, charger output voltage of a charger configured to provide an electric charge to the on-board energy storage device.

20. The apparatus of claim 19, wherein a contactor weld check includes determining if any of the contactors including the cart contactor, device contactor, and the another device contactor are welded, the contactor weld check including at least one of:

(1) a contactor weld check for drive configured to determine that the contactors are not welded if at least one of the following conditions are met: (a) a difference between capacitor bank voltage and pack output voltage is greater than a first threshold; and (b) a difference between a capacitor bank voltage and the voltage between the device contactor and the another device contactor is greater than a second threshold; and (2) a contactor weld check for charge configured to determine that the contactors are not welded if both of the following conditionals are true: (a) an absolute difference between charger output voltage and pack output voltage is less than a third threshold; and (b) pack voltage is greater than a fourth threshold.

* * * * *